(12) United States Patent
Majewicz et al.

(10) Patent No.: US 8,421,873 B2
(45) Date of Patent: Apr. 16, 2013

(54) SYSTEM COMPRISING TWO LAMPS AND AN OPTICAL SENSOR

(75) Inventors: Peter Majewicz, Boise, ID (US); Kurt E. Spears, Fort Collins, CO (US); Jennifer L. Melin, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 12/847,953

(22) Filed: Jul. 30, 2010

(65) Prior Publication Data

US 2012/0026353 A1    Feb. 2, 2012

(51) Int. Cl.
*H04N 5/228* (2006.01)
*H04N 5/225* (2006.01)
*H04N 3/02* (2006.01)

(52) U.S. Cl.
USPC ............. 348/222.1; 348/207.1; 348/139; 348/201

(58) Field of Classification Search .......... 348/262, 348/237, 222.1, 211.11, 159, 139, 201, 47, 348/239; 382/254, 276
See application file for complete search history.

(56) References Cited

U.S. PATENT DOCUMENTS

| 3,550,519 A | * | 12/1970 | Lewis .......................... 396/422 |
| 2003/0133013 A1 | * | 7/2003 | Maeda et al. ................. 348/143 |
| 2006/0222260 A1 | * | 10/2006 | Sambongi et al. ........... 382/274 |
| 2008/0180530 A1 | * | 7/2008 | Keam .......................... 348/207.1 |
| 2008/0212150 A1 | | 9/2008 | Bremm et al. |
| 2009/0167887 A1 | | 7/2009 | Ueda et al. |

FOREIGN PATENT DOCUMENTS

| JP | 2009060393 A | 3/2009 |
| TW | 200612181 | 4/2006 |
| TW | M347595 Y | 12/2008 |

OTHER PUBLICATIONS

C. Herley, "Document Capture Using a Digital Camera," Image Processing, 2001. Proceedings, 2001 International Conference on: Issue Date: Oct. 7-10, 2001, vol. 2, pp. 1041-1044.
S. Pollard et al., "Building Cameras for Capturing Documents," International Journal on Document Analysis and Recognition, vol. 7, Pub. date: Jul. 2-3, 2005, 3 p.
Dukane, "DVP 505A," Dukane Corporation Copyright 2007, 2 p.
Smart Technologies, "SMART Document Camera," Smart Technologies Copyright 2008, 2 p.

* cited by examiner

*Primary Examiner* — Roberto Velez
*Assistant Examiner* — Stephen Coleman (57) ABSTRACT

A system composed of a housing and an arm coupled to the housing. The arm supports a first lamp, a second lamp, and an optical sensor.

13 Claims, 11 Drawing Sheets

SYSTEM COMPRISING TWO LAMPS AND AN OPTICAL SENSOR

BACKGROUND

Document capture systems use a combination of a camera and a lighting element to acquire an image of a subject. Digital camera manufacturers use "zonal correction," which divides an image into small zones and applies different corrections to each zone, to adjust the response of the camera based on the location within the image of each zone. This allows the camera to calibrate various non-uniformities captured by its sensor array such as gain, shading and lens falloff. However, illumination of the subject cannot be calibrated.

Specular reflections are mirror-like reflections of light from a document, which may cause non-uniformities in an image of a document. Camera-based document capture systems use multiple diffuse lamps to physically prevent specular reflections by minimizing glare on the subject. However, diffuse lamps are bulky, expensive and must be placed further away from the document stage to avoid specular reflections.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

In the following discussion and in the claims, the term "image" refers to a captured rendering of a subject, and may be digital or analog in nature. The term "frame" refers to a part of an image, which can include the whole image. Additionally, dots per inch ("DPI") is a measure of spatial printing, image or video dot density, in particular the number of individual dots that can be placed in a line within the span of 1 inch.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
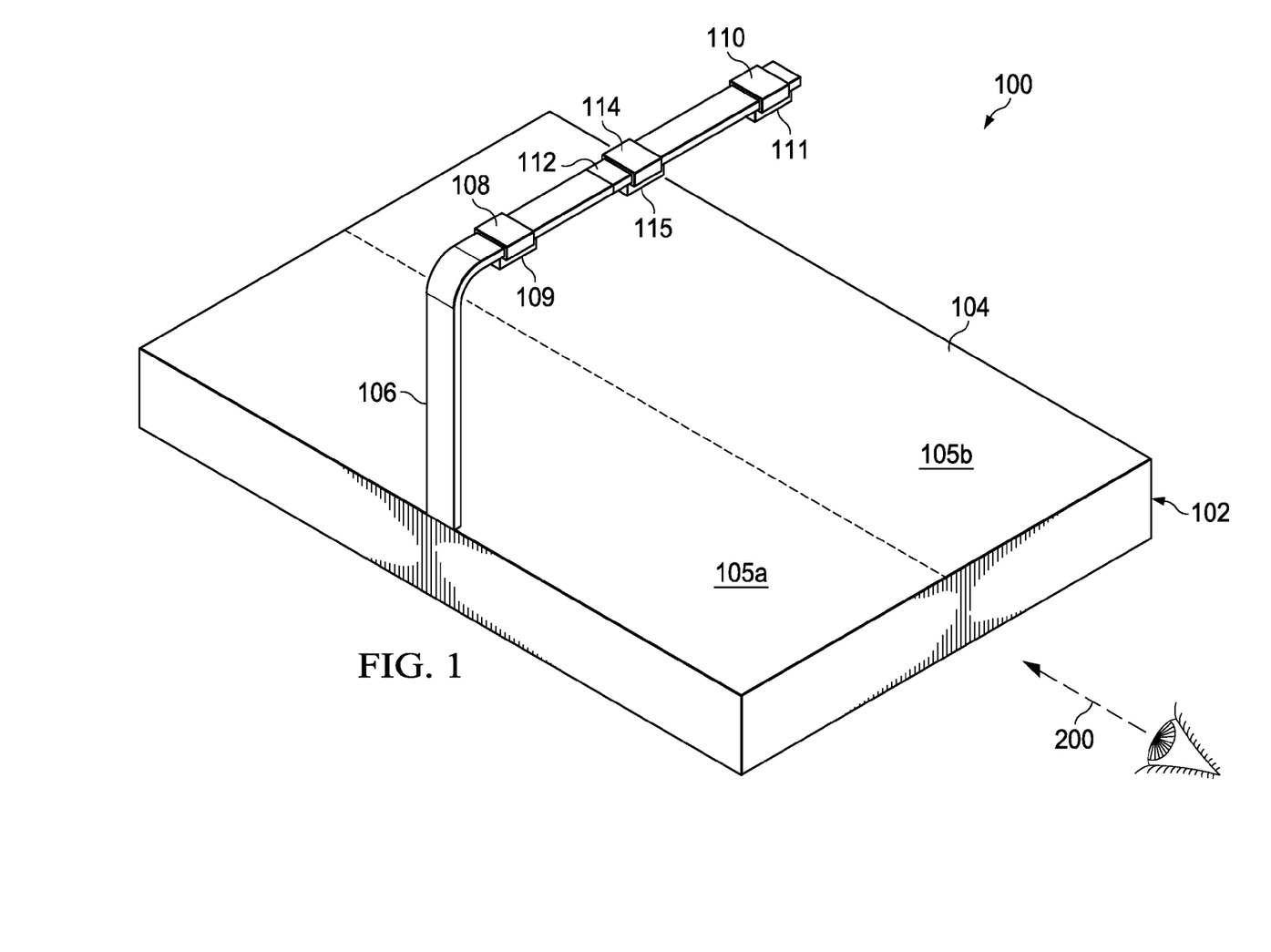
FIG. 1 shows a system in accordance with various embodiments.

FIG. 1 shows a system 100 in accordance with various embodiments. A housing 102 comprises a planar surface 104 having a first side portion 105*a* and a second side portion 105*b*. The planar surface 104 may be a platen as used in document capture systems. An arm 106 is coupled to the housing 102 and is in a fixed arrangement to the housing 102 or in a moveable arrangement (e.g., hinged) to the housing 102. If the arm 106 is coupled to the housing 102 in a moveable arrangement, then the arm is in a deployed position when the system 100 is in use. The arm 106 supports a first lamp 108, a second lamp 110 and an optical sensor 112. In some embodiments, the arm 106 additionally supports a third lamp 114. In an exemplary embodiment, the housing 102 comprises a printing device that is configured to print an image captured by the optical sensor 112 or another image.

In an exemplary embodiment, the lamps 108, 110, 114 are light-emitting diodes ("LEDs") or arrays of multiple LEDs; however, one skilled in the art would understand that other light-producing elements may be similarly used. Additionally, the lamps 108, 110, 114 may each comprise a focusing mechanism 109, 111, 115. The focusing mechanism 109, 111, 115 directs the illumination of the lamps 108, 110, 114 to better overcome ambient lighting of the environment where the system 100 is positioned. The focusing mechanism 109, 111, 115 may comprise a Fresnel lens, a back-reflector, diffuser or other focusing mechanism known by those one skilled in the art. The optical sensor 112 is a complementary metal oxide semiconductor ("CMOS") optical sensor. In alternate embodiments, the optical sensor 112 is a charge coupled device ("CCD") or any suitable device for image capture.

By utilizing LEDs as the lamps 108, 110, 114 and a CMOS or CCD optical sensor 112, the form factor of the arm 106 is minimized. Furthermore, rather than positioning each lamp 108, 110, 114 in a separate arm assembly, the arm 106 supports both lamps 108, 110, 114 in addition to the optical sensor 112. In an exemplary embodiment, the optical sensor 112 is located between the first and second lamps 108, 110 on the arm 106 and is located above a midpoint of the planar surface 104, such as the division between the first and second side portions 105*a*, 105*b*, when the arm 106 is in a deployed position. The third lamp 114 is located proximate to the optical sensor 112. The first lamp 108 is positioned above the first side portion 105*a* and the second lamp 110 is positioned above the second side portion 105*b*. Although the first lamp 108 is positioned above the first side portion 105*a*, the first lamp 108 focuses on the second side portion 105b. Similarly, the second lamp 110 focuses on the first side portion 105a. The third lamp 114 focuses approximately on the midpoint between the first side portion 105a and the second side portion 105b.

Figure 2:
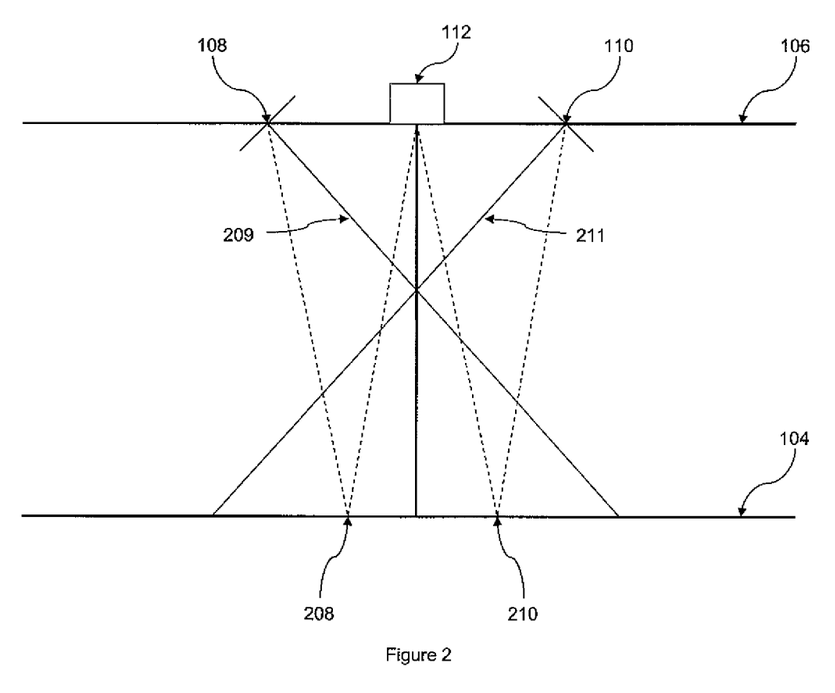
FIG. 2 shows a side view schematic of a system in accordance with various embodiments.

FIG. 2 shows a side view of the system 100 along the 200 axis. The first lamp 108 generates a specular "hotspot" 208 and the second lamp 110 generates a specular "hotspot" 210. The specular hotspots 208, 210 represent the first-order reflections from the lamps 108, 110 to the optical sensor 112; in other words, the points that directly reflect light from the lamps 108, 110 to the optical sensor 112. Specular hotspots 208, 210 create non-uniformities in an image captured by the optical sensor 112 that are undesirable for representing a captured document or object.

In an exemplary embodiment, each lamp 108, 110 is positioned 50 millimeters away from the optical sensor 112 on the arm 106. Furthermore, the optical sensor 112 is positioned on the arm 106 such that the optical sensor 112 is 192 millimeters away from the planar surface 104. Additionally, the angle formed between the line of focus 209, 211 of the lamps 108, 110 and the arm 106 is 55 degrees. One skilled in the art would understand that these positions are exemplary, and other distances and arrangements may be similarly utilized depending on the size of the specular hotspots 208, 210 and other design considerations.

Figure 3A:
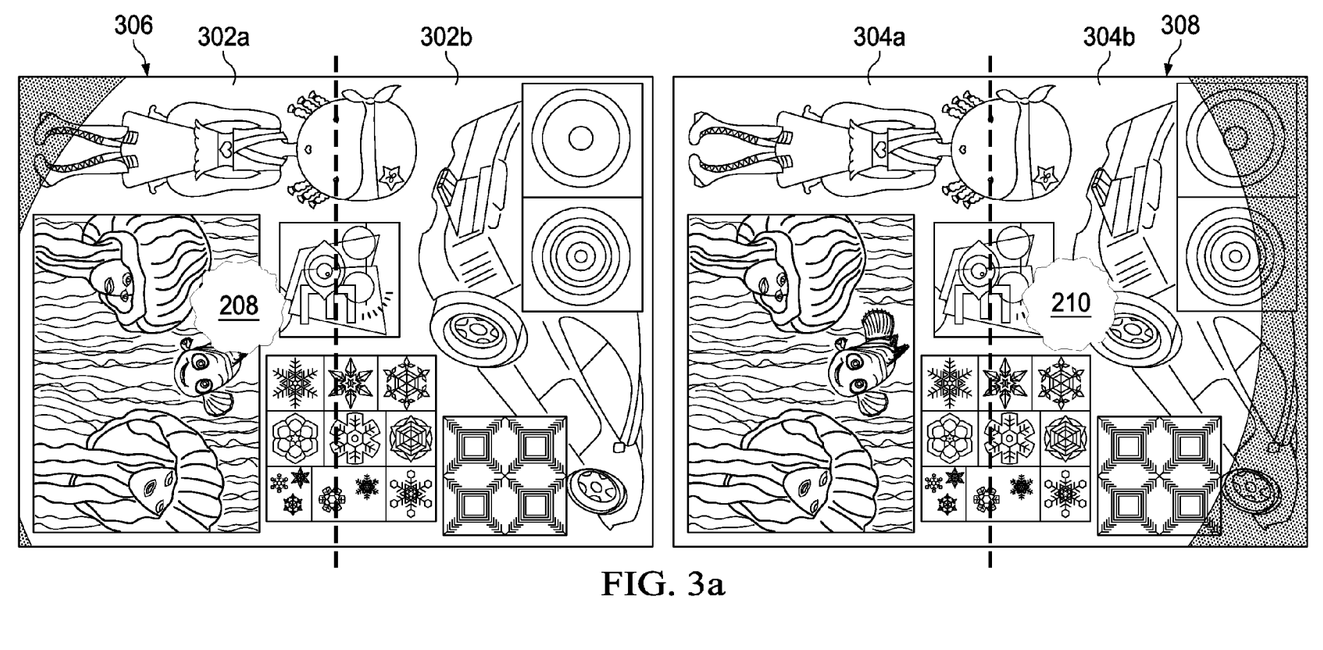
FIG. 3*a* shows an exemplary image in accordance with various embodiments.

As a result of the above design parameters and using the worst-case glare media (e.g., HP Premium Ink Jet paper), the specular hotspots 208, 210 are 40 millimeters wide. Each lamp 108, 110 is positioned more than 40 millimeters away from the optical sensor 112, however, and thus the specular hotspot 208 resulting from the first lamp 108 is confined to the first side portion 105a of the planar surface 104 and the specular hotspot 210 resulting from the second lamp 110 is confined to the second side portion 105b of the planar surface 104. FIG. 3a shows two exemplary captured images, the left image is captured using the first lamp 108 and the right image is captured using the second lamp 110. The left image comprises a frame 302a corresponding to the first side portion 105a and a frame 302b corresponding to the second side portion 105b. Similarly, the right image comprises a frame 304a corresponding to the first side portion 105a and a frame 304b corresponding to the second side portion 105b.

The left image shows the specular hotspot 208 caused by the first lamp 108 in the frame 302a. The right image shows the specular hotspot 210 caused by the second lamp 110 in the frame 304b. These specular hotspots 208, 210 cannot be corrected for using image processing, and thus they render frame 302a of the left image and frame 304b of the right image unsuitable for representing the subject.

The use of the focusing mechanism 109, 111 transforms the illumination of the lamps 108, 110 into a directed cone, which creates an extreme non-uniformity on the subject. The non-uniformity at the cone edges may degrade the quality of a captured image of the subject. Referring to FIG. 3a, the non-uniformities created by cone edges 306, 308 are apparent. Each non-uniformity created by the cone edges 306, 308 is on the same side portion 105a, 105b as the specular hotspots 208, 210 created by the lamps 108, 110.

As a result, the left image contains a defect-free frame 302b, which corresponds to the second side portion 105b (i.e., the side portion that the first lamp 108 is focused on). The defect-free frame 302b of the left image corresponds to the right half of the subject. Likewise, the right image contains a defect-free frame 304a, which corresponds to the first side portion 105a (i.e., the side portion that the second first lamp 110 is focused on). The defect-free frame 304a of the right image corresponds to the left half of the subject. Thus, when combined, these defect-free frames 302b, 304a form a full defect-free frame.

In an exemplary embodiment, the subject is illuminated only by the first lamp 108 during a first time period and only by the second lamp 110 during a second time period. As a result, the illumination of the subject during the first time period differs from the illumination of the subject during the second time period and the images captured 302a/b, 304a/b reflect the differing illuminations. As discussed above, each of the lamps 108, 110 introduce non-uniformities 208, 210, 306, 308 to the captured images. Using only one lamp 108, 110 in each of the two time periods confines the non-uniformities to one half of each captured images as shown in FIG. 3a.

Figure 3B:
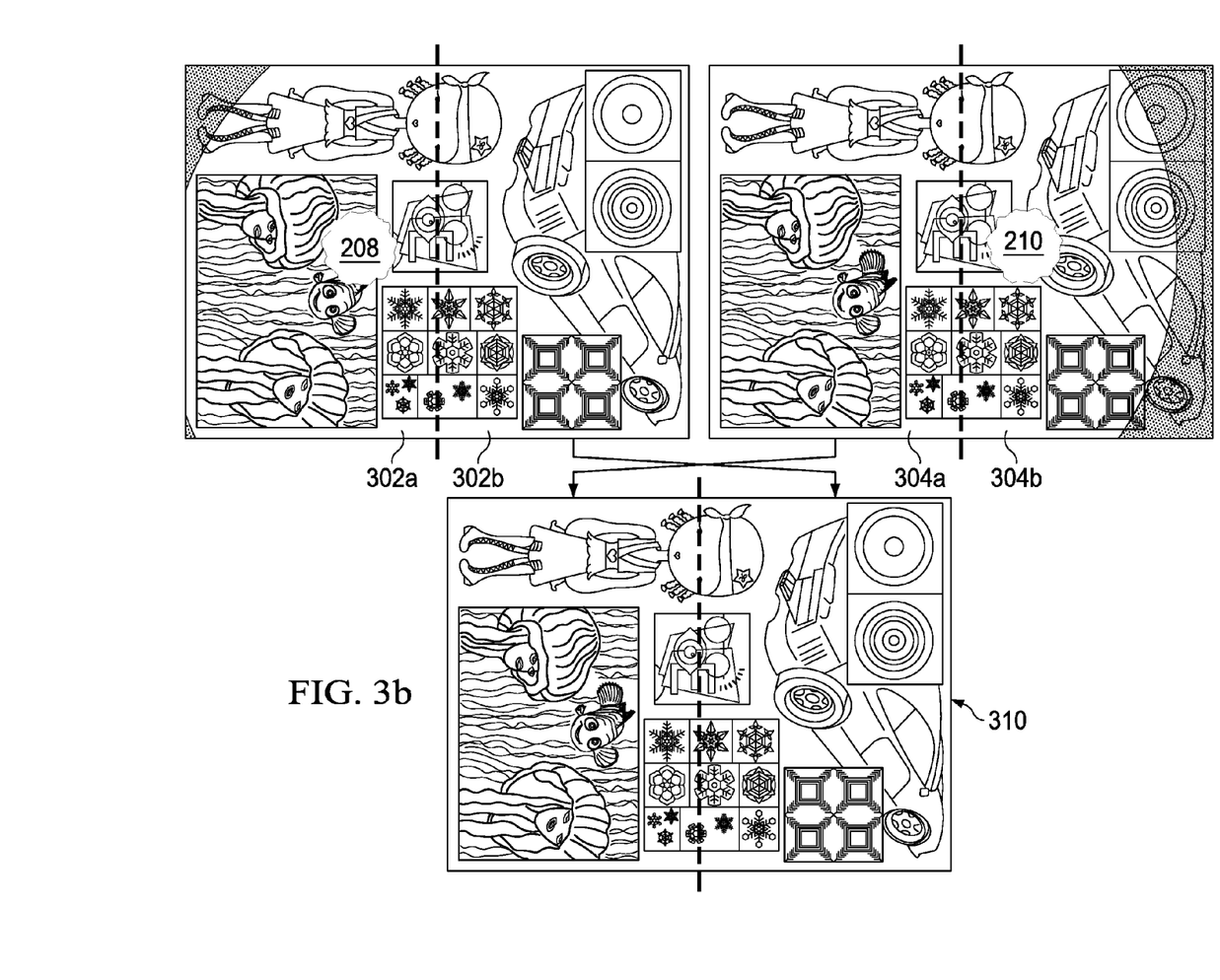
FIG. 3*b* shows an exemplary combination of images in accordance with various embodiments.
Figure 4A:
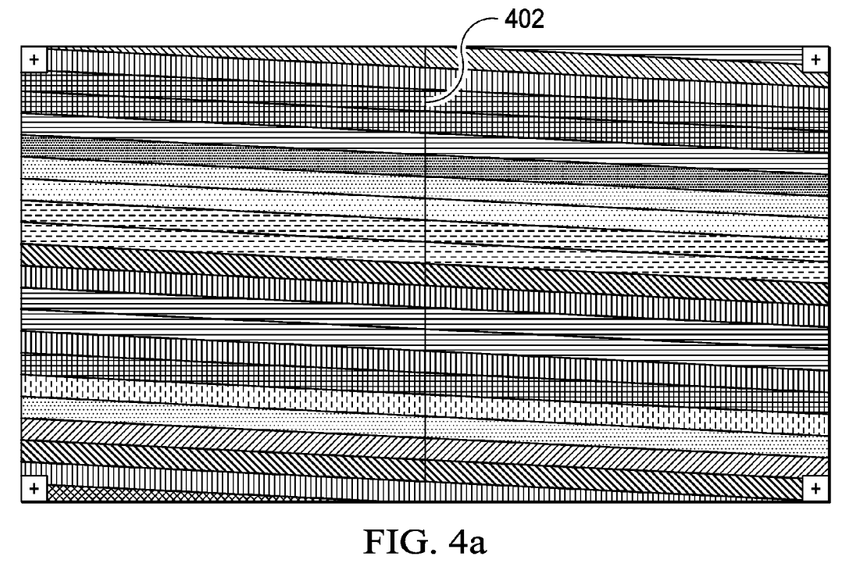
FIGS. 4*a* and 4*b* show further exemplary combinations of images in accordance with various embodiments.

FIG. 3b illustrates the combination of the defect-free frames 302b, 304a of the left and right images of FIG. 3a, taking advantage of the portions with the best uniformity. The resulting frame 310 does not contain the specular hotspots 208, 210, nor does it contain the non-uniformities created by the cone edges 306, 308. However, the two frames 302b, 304a cannot simply be butted against each other, because a vertical stitch line is evident. FIG. 4a shows a vertical stitch line 402 resulting from butting two frames taken with differing light sources as shown in FIG. 3b. The vertical stitch line 402 results from the shading differences between two frames, each taken using a differing light source, produced by the directionality of the lamps 108, 110.

Figure 4B:
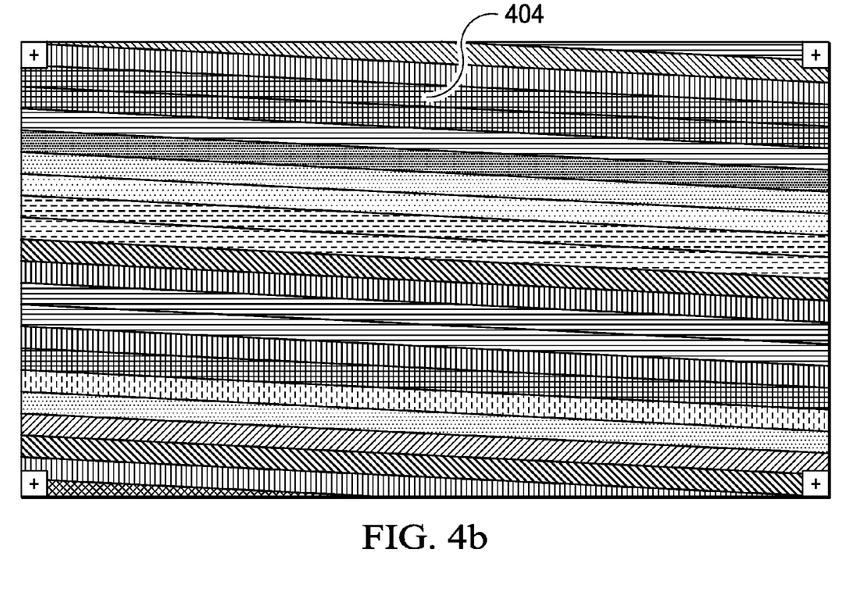

In accordance with various embodiments, to eliminate the vertical stitch line 402, the two frames 302b, 304a are merged. FIG. 4b shows the lack of a vertical stitch line 404 resulting from using an exemplary merging algorithm. The exemplary merging algorithm computes a pixel-by-pixel weighted average of the two frames. For example, the average of two pixels may be computed by averaging the color contribution of each pixel. One skilled in the art would understand that varying techniques for averaging pixels may be used depending on the file storage structure utilized for storing images captured by the optical sensor 112.

Figure 5:
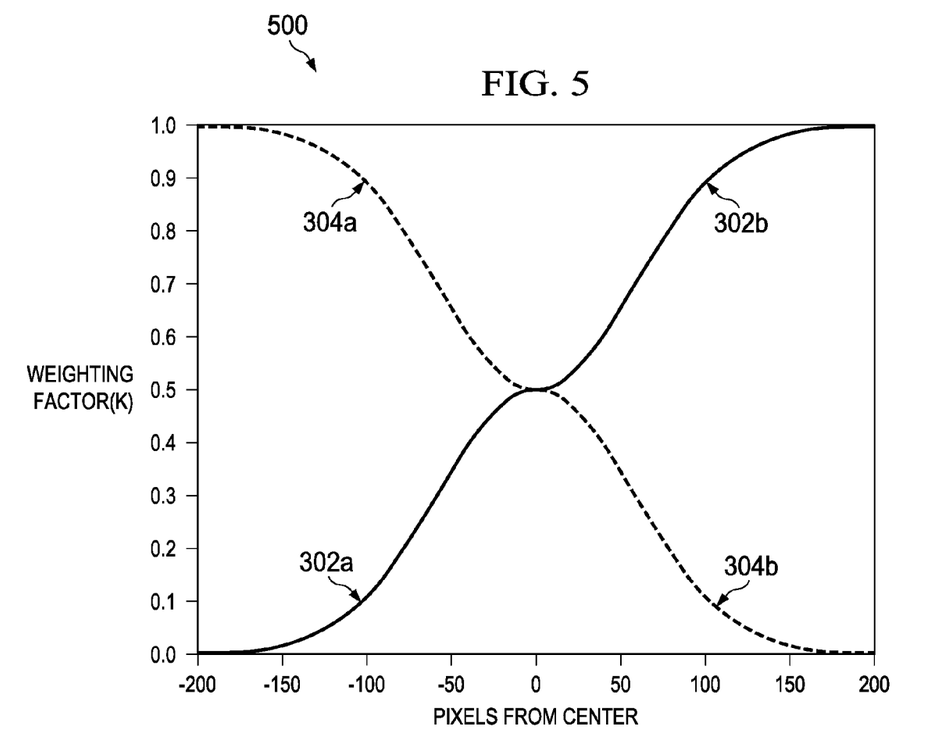
FIG. 5 shows an exemplary graph in accordance with various embodiments.

FIG. 5 shows a graph 500 of the weighted contribution of pixels of frame 302a, 302b, 304a and 304b as a function of the distance of the pixel from a specified plane (e.g., the midpoint of the optical sensor's 112 field of view, which divides the first side portion 105a from the second side portion 105b; or the boundary represented by 302a/b and 304a/b). The weighted contribution of each frame 302a/b, 304a/b is equal (i.e., 0.5) at the specified plane, shown by the intersection on the graph 500. As the distance away from the specified plane increases, the weighted contributions of the dominant frames 302b, 304a combined to produce the resulting image 310, as in FIG. 3b, taper up to 1.0. Likewise, the weighted contributions of the non-dominant frames 302a, 304b, which contain non-uniformities 208, 210, 306, 308 taper down to 0.0. One skilled in the art would understand that the sum of the weighted contributions for each given pixel is 1.0. For example, as the distance away from the specified plane increases in the direction of frame 302b (i.e., to the right), the weighted contribution of frame 302b is 0.8 at a given distance; at the same distance away from the specified plane, the weighted contribution of frame 304b is 0.2. The converse is true as the distance away from the specified plane increases in the direction of frame 304a (i.e., to the left).

The graph 500 shows a region that spans +/−200 pixels from the specified plane, which is small compared to the size of the overall image. For example, using an optical sensor 112 with a native resolution of 270 DPI, an image that spans 11.5 inches in the direction perpendicular to the specified plane measures 3105 pixels in that direction. The region specified in graph 500 could be adjusted to be larger or smaller, however the non-uniformities 208, 210, 306, 308 should contribute minimally, if at all, to the weighted average. In an exemplary embodiment, the width of the merged region shown in graph 500 is such that the non-uniformities 208, 210, 306, 308 do not contribute to the merged image.

In an exemplary embodiment, the graph 500 represents a curve that is Gaussian in nature. However, one skilled in the art would understand that other curves, such as a linear curve, may be alternately utilized to determine the weighted contribution of each frame 302*a/b*, 304*a/b*. Additionally, further image processing, using calibration maps or other techniques known by those skilled in the art, may be applied to the defect-free image to improve any remaining non-uniformities.

Figure 6:
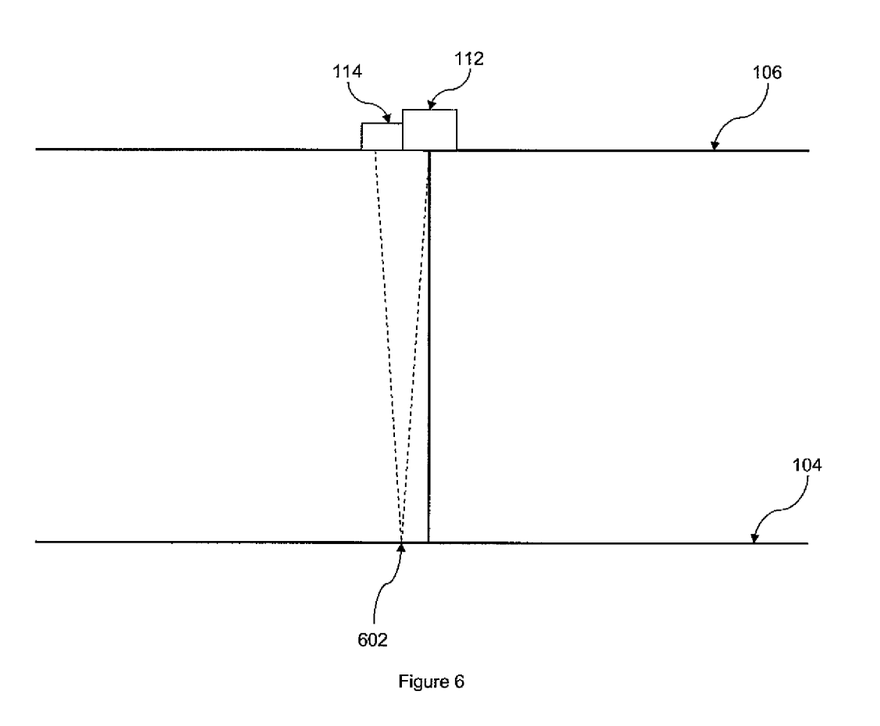
FIG. 6 shows another side view schematic of a system in accordance with various embodiments.

FIG. 6 shows another side view of the system 100 along the 200 axis. The third lamp 114 is positioned as close to the optical sensor 112 as is possible. In some embodiments, coaxial illumination, where the light from the center lamp is directed through the optical sensor 112 optics, is utilized to achieve a close placement; alternatively, the third lamp 114 is positioned, for example, 10 millimeters away from the optical sensor 112 on the arm 106. The first and second lamps 108, 110 (not shown) can exaggerate shadows created by a three-dimensional object because of their angle of focus on the platen 104. However, positioning the third lamp 114 proximate to the optical sensor 112 causes shadows to be reduced when capturing an image of a three-dimensional object using only the third lamp 114. Shadows are minimal when capturing a document, or other two-dimensional image, using the first and second lamps 108, 110.

In accordance with various embodiments, a third image of a subject is captured using the third lamp 114. The third image contains fewer shadows than the first and second images, particularly if the subject is a three-dimensional object. If the subject is a two-dimensional object, such as a document or picture, then there will be few, if any, shadows present in both the third image and the first and second images. Thus, if the first and second images contain too many shadows, which may be determined by, for example, exceeding a threshold, then the third image is used. If the first and second images do not contain too many shadows, or are below the threshold, then the first and second images are used as described above.

Figure 7A:
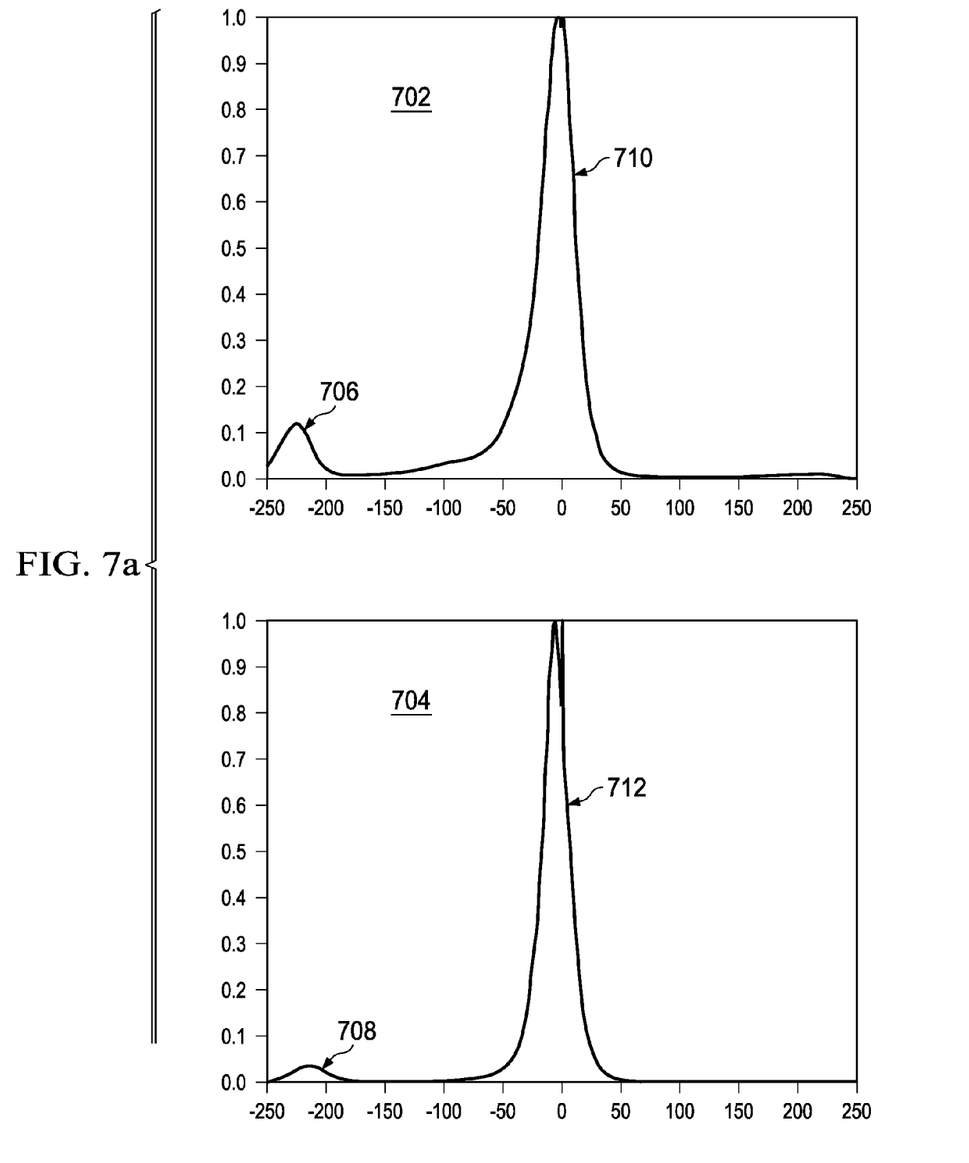
FIGS. 7*a* and 7*b* show exemplary histograms in accordance with various embodiments.
Figure 7B:
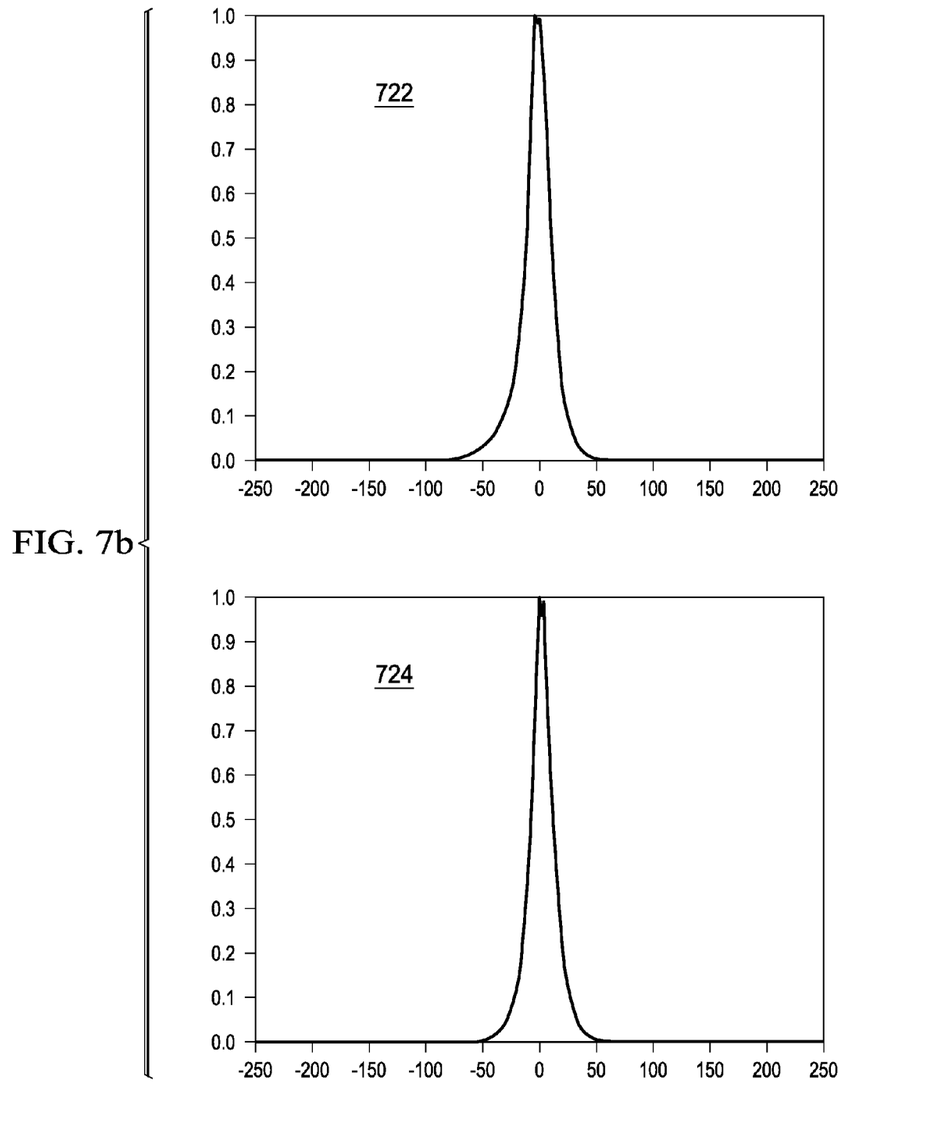

In an exemplary embodiment, a pixel-by-pixel difference is taken between each of the first and second images and the third image. The difference may correspond to a brightness value of each pixel, where bright (e.g., near white) pixels have a high value such as 250 and dark (e.g., near black) pixels have a low value such as 5. One skilled in the art would understand that the values for brightness may differ based on the number of bits used to represent colors and that the above is exemplary using an 8-bit color depth. Where a shadow is present in the first or second image, the difference in pixel value will be large for a number of pixels in the area where a shadow is present since the third lamp 114 will largely eliminate shadows from the view point of the optical sensor 112. FIGS. 7*a* and 7*b* show histograms 702, 704 and 722, 724 that demonstrate the number of pixels exhibiting a range of differences (e.g., +/−255) between the first or second image and the third image. One histogram 702, 722 corresponds to the differences in pixel value between the first image and the third image and the other histogram 704, 724 corresponds to the differences in pixel value between the second image and the third image.

The existence of outlying nodes 706, 708 on the left sides of the histograms 702, 704 demonstrates the presence of shadows. Such shadowing commonly occurs when capturing images of three-dimensional objects where the first and second lamps 108, 110 cause significant shadows to be cast from the view point of the optical sensor 112. These nodes 706, 708 represent a number of pixels where the difference between the first or second image and the third image is large, such as where a shadow is present. Conversely, the central nodes 710, 712 represent the large number of pixels that are very similar between the two images (i.e., the pixels where shadowing is not present, and thus the images captured using the first and second lamps 108, 110 and the third lamp 114 are similar).

FIG. 7*b* shows histograms 722, 724 demonstrating the absence of shadows by the lack of an outlying node, signifying that the majority of pixels have not changed under the different lighting conditions caused by the first and second lamps 108, 110 and the third lamp 114. Such histograms 722, 724 commonly occur when capturing images of flat media, such as documents or photographs.

As shown, the histograms 702, 704, 722, 724 are normalized to a value of 1.0. In some embodiments, the number of pixels where the difference is zero (i.e., the center of the histogram) is ignored when normalizing because a difference of zero represents pixels that have not changed under the different lighting conditions and can be a very large number. Ignoring this large number of identical pixels increases the sensitivity to smaller areas of shadowing. One skilled in the art would understand that the histograms 702, 704, 722, 724 are exemplary, and other shadow detection mechanisms may be used.

In accordance with various embodiments, the presence of shadows in the first or second image is determined by analyzing the histograms 702, 704, 722, 724 shown in FIGS. 7*a* and 7*b*. For example, a first threshold value establishes a minimum difference between the pixels of the first or second images and the third image to be considered. For example, the first threshold value when using an 8-bit color depth is −189; in other words, pixels having a difference of less than 189 units will not contribute to the next step of the analysis. In the next step, a "shadow strength" score is determined for each histogram. The shadow strength score corresponds to the area under the histogram for all difference values above the first threshold (i.e., the total number of pixels having differences greater than 189, or less than −189). If the shadow strength score exceeds a second threshold, for example 0.5, then the first or second image contains significant shadowing. If the shadow strength score indicates a significant presence of shadows (i.e., above the second threshold), then the third image is used; if a significant presence of shadows is not indicated, the first and second images are merged or corrected and used as described above.

For reasons similar to those discussed above with respect to the first and second lamps 108, 110, the third lamp 114 causes considerable glare in the center of the frame, resulting from a specular hotspot 602 (shown in FIG. 6). Glare pixels in the third image are much brighter than corresponding non-glare pixels in the first and second images, and thus these may be misclassified as shadow pixels. To avoid such a misclassification, the analysis ignores the rectangular region directly under the optical sensor 112 that is most likely to contain induced glare 602 from the third lamp 114. One skilled in the art would understand that the dimensions of this region are dependent on the particular staging configuration. In some embodiments, glare may exist in the third image in other areas as well, and thus pixels in the third image having a value exceeding a third threshold (e.g., 254) are ignored in determining the shadow strength score.

Figure 8:
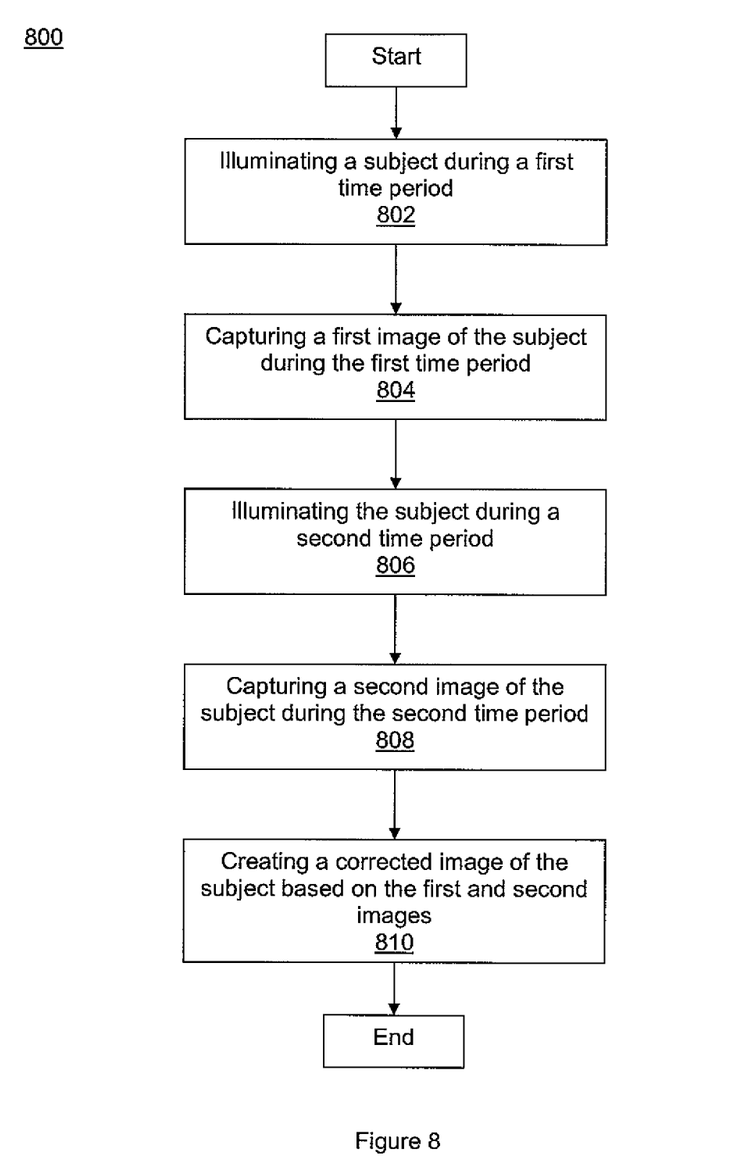
FIG. 8 shows a method flow chart in accordance with various embodiments.

FIG. 8 shows a method 800 in accordance with various embodiments. The method 800 begins with illuminating a subject during a first time period (block 802). In accordance with various embodiments, the subject is illuminated during the first time period using a first lamp 108. In an exemplary embodiment, the first lamp 108 is an LED; however, one skilled in the art would understand that other light-producing elements may be similarly used. Additionally, the first lamp 108 may comprise a focusing mechanism 109. The focusing mechanism 109 magnifies the illumination of the first lamp 108 to better overcome ambient lighting of the environment where the subject is illuminated. The focusing mechanism 109 may comprise a Fresnel lens, a back-reflector, diffuser or other focusing mechanism known by those one skilled in the art.

The method 800 proceeds to capturing a first image of the subject during the first time period (block 804). In accordance with various embodiments, the subject is captured during the first time period using an optical sensor 112. In an exemplary embodiment, the optical sensor 112 is a CMOS optical sensor. In alternate embodiments, the optical sensor 112 is a CCD or any suitable device for image capture.

The method 800 then proceeds to illuminating the subject during a second time period (block 806). In accordance with various embodiments, the subject is illuminated during the second time period by a second lamp 110. The second lamp 110 may be similar to the first lamp 108 described above.

The method 800 next proceeds to capturing a second image of the subject during the second time period (block 808). In accordance with various embodiments, the subject is captured during the second time period using the optical sensor 112, as described above.

In an exemplary embodiment, the optical sensor 112 is located between the first and second lamps 108, 110 on an arm 106. The first lamp 108 is positioned above the first side portion 105a and the second lamp 110 is positioned above the second side portion 105b. Although the first lamp 108 is positioned above the first side portion 105a, the first lamp 108 focuses on the second side portion 105b. Similarly, the second lamp 110 focuses on the first side portion 105a.

In an exemplary embodiment, the subject is illuminated only by the first lamp 108 during the first time period and only by the second lamp 110 during the second time period. As a result, the illumination of the subject during the first time period differs from the illumination of the subject during the second time period and the images captured (blocks 804 and 808) reflect the differing illuminations. As discussed above, each of the lamps 108, 110 introduce non-uniformities 208, 210, 306, 308 to the captured images. Using only one lamp 108, 110 in each of the two time periods confines the non-uniformities to one half of each captured images as shown in FIG. 3a.

The method 800 then proceeds to creating a corrected image of the subject based on the first and second images (block 810) and ends. The corrected image may be created by combining the defect-free portions of each of the first and second images as described above with respect to FIG. 3b. Furthermore, the defect-free portions may be merged using algorithms as described above with respect to FIG. 5 and further image processing, using calibration maps or other techniques known by those skilled in the art, may be applied to the defect-free image to improve any remaining non-uniformities.

Figure 9:
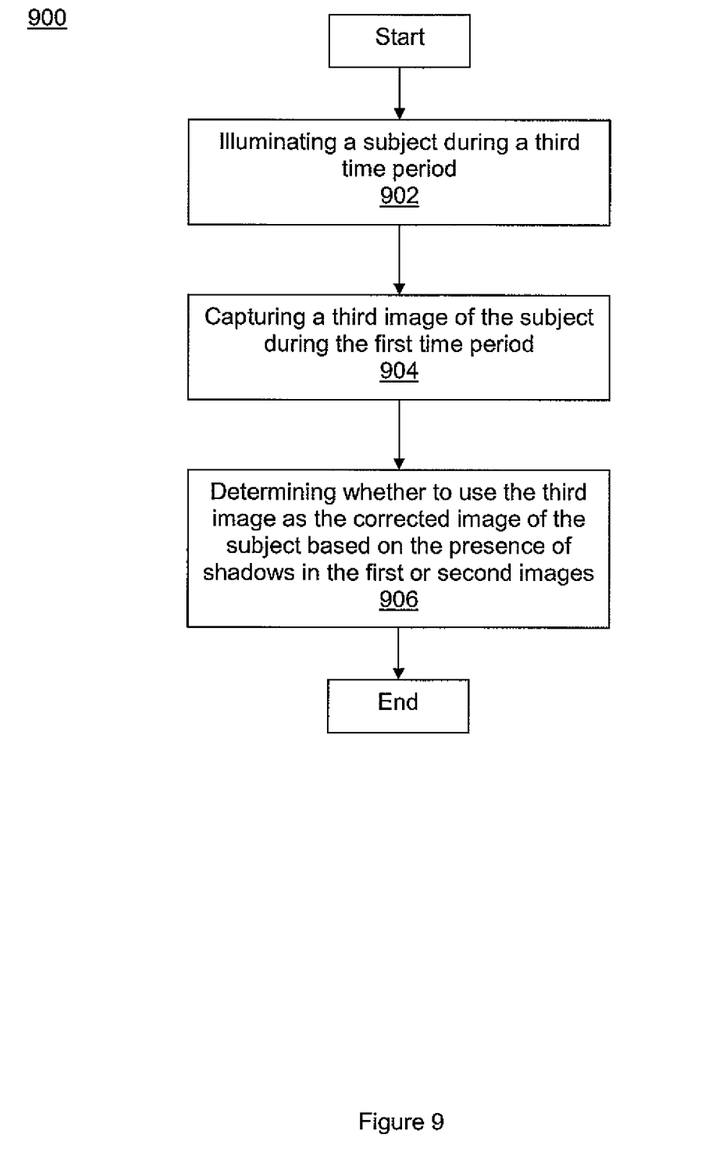
FIG. 9 shows another method flow chart in accordance with various embodiments.

FIG. 9 shows another method 900 in accordance with various embodiments. The method 900 may be performed in conjunction with, or in addition to, the method 800. For example, the method 900 begins after either steps 808 or 810 of the method 800; however, one skilled in the art would understand that the method 900 may alternatively begin before the method 800. After the method 900 begins, the method 900 proceeds to illuminating the subject during a third time period (block 902). In accordance with various embodiments, the subject is illuminated during the third time period by a third lamp 114. The third lamp 114 may be similar to the first and second lamps 108, 110 described above.

The method 900 next proceeds to capturing a third image of the subject during the third time period (block 904). In accordance with various embodiments, the subject is captured during the third time period using the optical sensor 112, as described above.

The method 900 then proceeds to determining whether to use the third image as the corrected image of the subject (block 906) and ends. The determination may be based on the presence of shadows in the first or second images as compared to the third image. As discussed above, the analysis of histograms 702, 704, 722, 724 based on the difference of the first or second image and the third image, such as those in FIGS. 7a and 7b, identifies the presence of shadows in the first or second images. One skilled in the art would understand that the determination of block 906 may occur before or after the creation of the corrected image based on the first and second images. In other words, if the comparison of the first and second images to the third image occurs before the creation of the corrected image based on the first and second images, then the corrected image based on the first and second images will be created if significant shadows are not present in the first or second images.

In at least some embodiments, a computer-readable storage medium stores a set of instructions that, when executed, cause a processor to perform all or part of the method 800. Although not required, the computer-readable storage medium may be distributed as a portable memory (e.g., an optical disk or flash memory). Alternatively, the instructions are downloaded from a server for storage in a computer-readable medium of a computer system (e.g., a memory element of the computer system) that executes the instructions and performs the method 800. In some embodiments, the processor is a part of the system 100, for example contained in the housing 102, and thus coupled to the elements of the system 100. Alternatively, the processor is part of a separate computer system that couples to the system 100 and is configured to control the operation of one or more elements of the system 100. The method 900 may also be performed by a processor executing a set of instructions stored on a computer-readable storage medium.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A system comprising:
a housing;
an arm coupled to the housing, the arm supports:
a first lamp to illuminate a subject only during a first time period;
a second lamp to illuminate the subject only during a second time period; and
an optical sensor to capture a first image of the subject during the first time period and a second image of the subject during the second time period; and a processor to, for each pixel in the first image, compute an average of a pixel from the first image and a corresponding pixel from the second image, thereby creating a corrected pixel;

the processor further to bisect, with a dividing line, each of the first and second images;

wherein the average of the pixel from the first image and the corresponding pixel from the second image is a weighted average and a weight value of each pixel varies as a function of the distance of the pixel from the dividing line.

2. The system of claim 1 wherein the arm is hinged to the housing and the optical sensor is over a midpoint of the planar surface when the arm is in a deployed position.

3. The system of claim 1 wherein the optical sensor is positioned between the first and second lamps.

4. The system of claim 1 wherein:

the housing further comprises a first planar surface having a first side portion and a second side portion;

the first lamp is positioned above the first side portion and is focused at the second side portion; and the second lamp is positioned above the second side portion and is focused at the first side portion.

5. The system of claim 1 further comprising:

a third lamp;

wherein the third lamp is configured to illuminate the subject only during a third time period;

wherein the optical sensor is configured to capture a third image of the subject during the third time period; and wherein the processor is configured to determine whether to use the third image as the corrected image of the subject.

6. The system of claim 1 wherein the weight value of each pixel varies linearly or according to a Gaussian function with the distance of the pixel from the dividing line.

7. The system of claim 1 wherein the housing comprises a printing device configured to print an image of a subject captured by the optical sensor.

8. A method comprising:

illuminating, by a first lamp and not by a second lamp, a subject during a first time period;

capturing, by an optical sensor, a first image of the subject during the first time period;

illuminating, by the second lamp and not by the first lamp, the subject during a second time period;

capturing, by the optical sensor, a second image of the subject during the second time period;

computing an average of a pixel from the first image and a corresponding pixel from the second image, thus creating a corrected pixel;

repeating the computation of the average for all pixels in the first image; and bisecting with a dividing line, each of the first and second images;

wherein the average of the pixel from the first image and the corresponding pixel from the second image is a weighted average and a weight value of each pixel varies as a function of the distance of the pixel from the dividing line.

9. The method of claim 8 further comprising:

illuminating, by a third lamp and not by the first lamp or the second lamp, the subject during a third time period;

capturing, by the optical sensor, a third image of the subject during the third time period;

determining whether to use the third image as the corrected image of the subject.

10. The method of claim 8 wherein the weight value of each pixel varies linearly or according to a Gaussian function with the distance of the pixel from the dividing line.

11. A non-transitory computer-readable medium containing instructions that, when executed by a processor, cause the processor to:

cause a first lamp to illuminate a subject only during a first time period;

cause a second lamp to illuminate the subject only during a second time period;

cause an optical sensor to capture a first image of the subject during the second time period; and compute an average of a pixel from the first image and the corresponding pixel from the second image, thus creating a corrected pixel;

repeat the computation of the average for all pixels in the first image; and bisect, with a dividing line, each of the first and second images;

wherein the average of the pixel from the first image and the corresponding pixel from the second image is a weighted average and a weight value of each pixel varies as a function of the distance of the pixel from the dividing line.

12. The computer-readable medium of claim 11 wherein said instructions further cause the processor to:

cause a third lamp to illuminate the subject only during a third time period;

cause the optical sensor to capture a third image of the subject during the third time period;

determine whether to use the third image as the corrected image of the subject.

13. The computer-readable medium of claim 11 wherein the weight value of each pixel varies linearly or according to a Gaussian function with the distance of the pixel from the dividing line.

* * * * *

UNITED STATES PATENT AND TRADEMARK OFFICE
CERTIFICATE OF CORRECTION

PATENT NO. : 8,421,873 B2  
APPLICATION NO. : 12/847953  
DATED : April 16, 2013  
INVENTOR(S) : Peter Majewicz et al.

Page 1 of 1

It is certified that error appears in the above-identified patent and that said Letters Patent is hereby corrected as shown below:

In the Claims:

In column 10, line 1, in Claim 8, delete "bisecting" and insert -- bisecting, --, therefor.

In column 10, line 27, in Claim 11, before "second" insert -- first time period and a second image of the subject during the --.

Signed and Sealed this
Thirteenth Day of August, 2013

Teresa Stanek Rea
*Acting Director of the United States Patent and Trademark Office*